(12) United States Patent
Flake et al.

(10) Patent No.: US 8,352,524 B2
(45) Date of Patent: Jan. 8, 2013

(54) DYNAMIC MULTI-SCALE SCHEMA

(75) Inventors: Gary W. Flake, Bellevue, WA (US); Blaise Aguera y Arcas, Seattle, WA (US); Brett D. Brewer, Sammamish, WA (US); Anthony T. Chor, Bellevue, WA (US); Steven Drucker, Bellevue, WA (US); Karim Farouki, Seattle, WA (US); Stephen L. Lawler, Redmond, WA (US); Ariel J. Lazier, Seattle, WA (US); Donald James Lindsay, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 701 days.

(21) Appl. No.: 12/112,639

(22) Filed: Apr. 30, 2008

(65) Prior Publication Data

US 2009/0276445 A1   Nov. 5, 2009

(51) Int. Cl.
*G06F 17/30* (2006.01)
(52) U.S. Cl. ........... 707/912; 715/273; 715/700; 700/17
(58) Field of Classification Search .................... 700/17; 707/912; 715/273, 700
See application file for complete search history.

(56) References Cited

U.S. PATENT DOCUMENTS

| | | | |
|---|---|---|---|
| 5,982,369 A * | 11/1999 | Sciammarella et al. ...... | 715/835 |
| 6,018,344 A * | 1/2000 | Harada et al. ................. | 715/818 |
| 6,414,698 B1 * | 7/2002 | Lovell et al. ................... | 715/800 |
| 6,785,673 B1 | 8/2004 | Fernandez et al. | |
| 6,907,345 B2 | 6/2005 | Shipley et al. | |
| 7,139,768 B1 * | 11/2006 | Janzig et al. ............ | 707/999.102 |
| 7,181,373 B2 | 2/2007 | Le Cocq et al. | |
| 7,181,450 B2 | 2/2007 | Malloy et al. | |
| 7,333,982 B2 | 2/2008 | Bakalash et al. | |
| 2002/0032696 A1 * | 3/2002 | Takiguchi et al. ......... | 707/500.1 |
| 2004/0036718 A1 | 2/2004 | Warren et al. | |
| 2004/0093564 A1 * | 5/2004 | Kumhyr et al. ............... | 715/526 |
| 2006/0010380 A1 * | 1/2006 | Matsuzawa et al. .......... | 715/700 |
| 2006/0129591 A1 * | 6/2006 | Ramsey et al. ............... | 707/102 |
| 2008/0256444 A1 * | 10/2008 | Wang et al. .................... | 715/700 |

OTHER PUBLICATIONS

Zhou, et al. Design and Implementation of Multi-Scale Databases, C.S. Jensen et al. (Eds.): SSTD 2001, LNCS 2121, pp. 365-384, 2001. http://users.cs.cf.ac.uk/C.B.Jones/ZhouS_JoneCB_SSTD01_MSDB.pdf. Last accessed Apr. 28, 2008, 20 pages.

Rigaux, et al. Multi-Scale Partitions: Application to Spatial and Statistical Databases http://www.lri.fr/~rigaux/publis/RS95.pdf. Last accessed Apr. 28, 2008, 14 pages.

Spaccapietra, et al. GIS Databases: From Multiscale to MultiRepresentation http://lbdsun.epfl.ch/e/publications_new/articles.pdf/SARA.pdf. Last accessed Apr. 28, 2008, 14 pages.

(Continued)

*Primary Examiner* — Cheyne Ly
(74) *Attorney, Agent, or Firm* — Lee & Hayes, PLLC

(57) ABSTRACT

The claimed subject matter provides a system and/or a method that facilitates organizing and presenting data within a database. A data store can store a portion of data accessible to a user. A real time monitor component can dynamically track an amount of access for the portion of data within the data store. A display engine can render a multi-scaled view of the portion of data, wherein the multi-scaled view is based on the amount of access in which a size representation of the data is correlated with the amount of access.

20 Claims, 10 Drawing Sheets

OTHER PUBLICATIONS

Devogele, et al. Building a Multi-Scale Database with Scale-Transition Relationships, SDH'96 http://wagram.ecole-nayale.fr/fr/irenav/cv/devogele/pdf/Sdh1996_devogele.pdf. Last accessed Apr. 28, 2008 10 pages.

Jones, et al. Multi-Scale Spatial Database Design for Online Generalisation http://users.cs.cf.ac.uk/C.B.Jones/SDH00cbjones.pdf. Last accessed Apr. 28, 2008, 11 pages.

Timpf. "Cartographic Objects in a Multi-Scale Data Structure" in In Geographic Information Research: Bridging the Atlantic, edited by M. Craglia and H. Couclelis, 1997. http://www.geo.unizh.ch/~timpf/docs/Timpf_esf95.pdf. Last accessed Apr. 28, 2008, 16 pages.

Bedard, et al. Supporting Multiple Representations with Spatial Databases View Management and the Concept of "VUEL" http://www.ikg.uni-hannoyer.de/isprs/workshop/Abstract_Bedard_Bernier.pdf. Last accessed Apr. 28, 2008, 2 pages.

* cited by examiner

DYNAMIC MULTI-SCALE SCHEMA

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

In light of such advances, the amount of available electronic data grows and it becomes more important to store such data in a manageable manner that facilitates user friendly and quick data searches and retrieval. Today, a common approach is to store electronic data in one or more databases or data stores. In general, a typical data store can be referred to as an organized collection of information with data structured such that a computer program can quickly search and select desired pieces of data, for example. Commonly, data within a data store is organized via one or more tables. Such tables are arranged as an array of rows and columns.

Each individual piece of data, standing alone, is generally not very informative. Data store applications make data more useful because they help users organize and process the data. Data store applications allow the user to compare, sort, order, merge, separate and interconnect the data, so that useful information can be generated from the data and presented by the data. Capacity and versatility of databases have grown incredibly to allow virtually endless storage capacity utilizing databases. However, typical database systems are limited in conveying information or details in an efficient and streamlined manner. For example, a data file must be selected in a detailed view in order to present information such as a file name, a file size, a date of creation, accessed, modified, location, attributes, etc.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate presenting multi-scaled data associated with a data store. A display engine can provide a multi-scale interface to examine rich relational databases or data stores using a multi-scale schema that adjusts fields and values in accordance to data popularity (e.g., access, regularity of use, etc.) or other selected criteria. For instance, viewing data within the relational database can be overwhelming, yet the display engine can provide a multi-scale view that interacts with the database. Moreover, the display engine can diminish or eliminate portions of data that are frequently or never used or accessed to ensure the view is informative (e.g., manipulation of a schema related to the data store). A database, for example, can be searched over gender, size, color, but rarely property X. The display engine can allow the database to be viewed in which property X is illustrated relative to its popularity (e.g., very small in size with this case). Moreover, the display engine can leverage a real time monitor component in order to scale data based upon, usage patterns, data use, data access, data changes, data properties, etc.

In another aspect of the subject innovation, a data store can be queried and results can be organized with multi-scale views. The query can be sorted by user-defined criteria in which such query results can be organized and scaled accordingly. Thus, a user can dictate data presentation at a preferred granular scale. For instance, a book can be scaled (e.g., table of contents, chapters, pages, etc.), code can be scaled to (e.g., functionality, interfaces, inputs, outputs, variable names, etc.), or movies can be scaled (e.g., actors, dialogs, scenes, locations, etc.). In other aspects of the claimed subject matter, methods are provided that facilitate rendering multi-scale views of data related to a data store.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
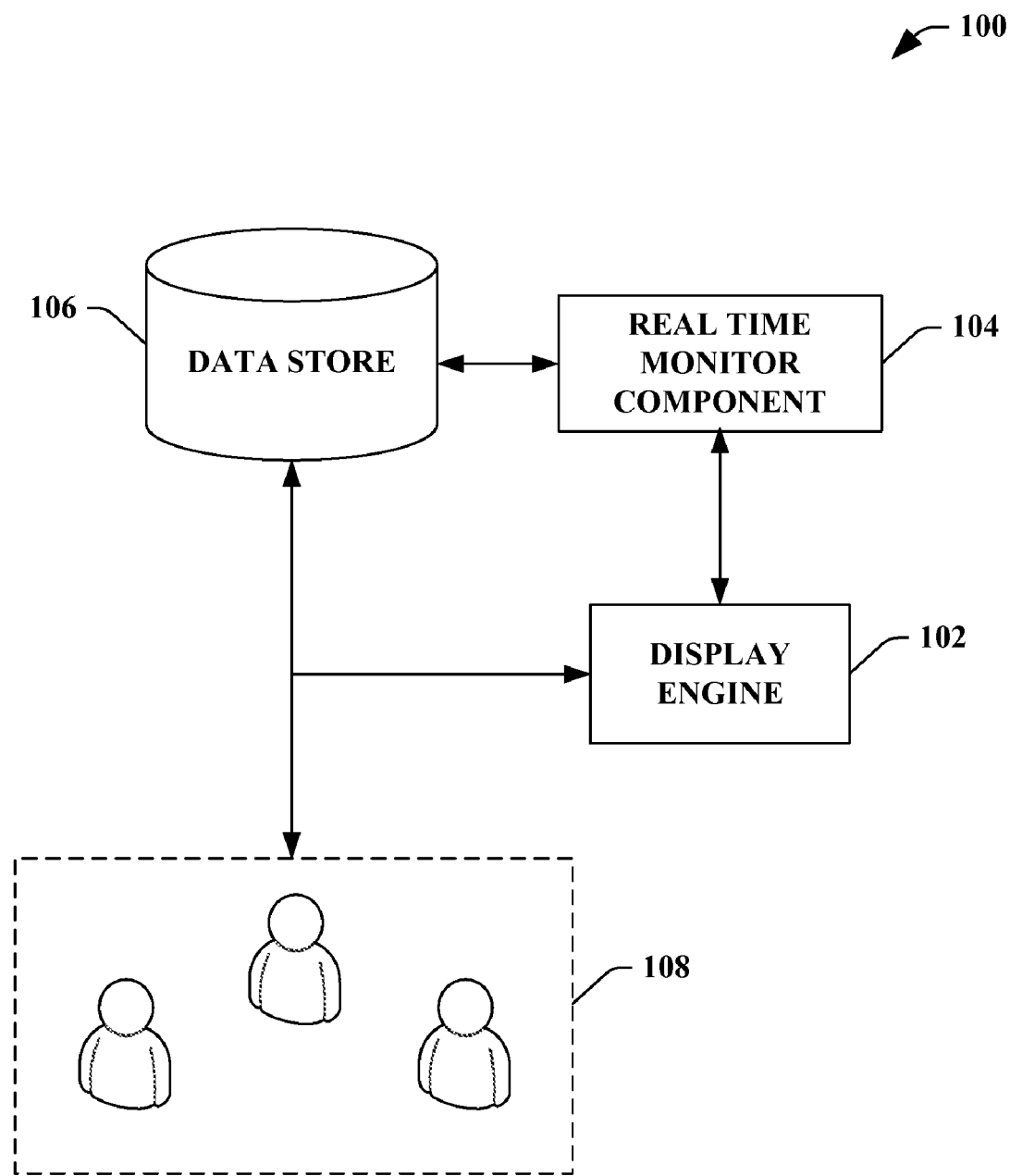
FIG. 1 illustrates a block diagram of an exemplary system that facilitates rendering multi-scale views of data related to a data store.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "engine," "adjuster," "schema," "aggregator," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates rendering multi-scale views of data related to a data store. The system 100 can include a display engine 102 that can browse a portion of data within a data store 106, wherein such data store 106 can be monitored by a real time monitor component 104. In general, the display engine 102 can enable enhanced data presentation for the portion of data within the data store 106 based on display features such as dynamic and seamless zooms and/or pans, various resolution display capabilities, large amount of data display capabilities, multi-scale views (e.g., data being displayed with various scaling, sizing, resolution, etc.), and/or multiple view-levels. With this enhanced data presentation, users 108 can efficiently browse, navigate, and/or view data within the data store 106 in accordance with user-defined criteria (e.g., user preferences, scale criteria, view-level criteria, etc.), automatically defined criteria, and/or any suitable combination thereof Specifically, the real time monitor component 104 can track activity within the data store 106 in which the display engine 102 can leverage in order to automatically generate multi-scaled views of a portion of data within the data store 106. Moreover, the users 108 can define criteria for the display engine 102 to generate multi-scaled views, wherein such criteria can be data activity (e.g., tracked by the real time monitor component 104) or any other suitable data property (discussed in more detail below).

For instance, access and/or interaction with data within a database can be monitored and/or tracked in order to allow a multi-scaled view to be generated in which graphical representations of data within the database can be scaled based upon the amount of access and/or interaction. In one example, an increase in scaled size can correspond to an increase for the activity, interaction, or other data specifics used to generate the multi-scaled view. The multi-scaled view can be automatically created based upon the activity within the database in order to provide efficient viewing of data which can convey information related thereto. For instance, by exploring data within the database with the subject innovation, a quick glance can convey or reveal specifics (e.g., amount of data access, size of data, modification frequency, amount of deleted data, amount of created data, etc.) by noting the size of a graphical representation for a portion of data within the data store.

In another example, a user can define particular criteria for viewing data and/or generating multi-scaled views of data within a data store. For instance, the user can select criteria particular to his or her preference in order to view data in an efficient manner. Such criteria can be data properties (e.g., creation data, accessed data, modification data, owner, location, size, type, application affiliation, security information, attributes, etc.), information associated with the data store (e.g., type of data store, location within data store, index information, tagging of data, table information, etc.), activity related to the data store (e.g., monitored by the real time monitor component 104), and/or any other suitable data related to stored data within the data store 106. In particular, the display engine 102 can receive scale criteria (e.g., defines scaling on a particular view-level) and view-level criteria (e.g., defines data included on each view-level) to generate multi-scale views of data store data.

In addition, the system 100 can be utilized to automatically modify schema related to the data store 106 based at least in part upon the interaction, exploration, navigation, and/or presentation of data by the display engine 102. In general, a portion of schema associated with the data store 106 can be adjusted by leveraging the display engine 102 activity (discussed in more detail below). Moreover, the system 100 can provide query results with multi-scaled views which can be scaled or sized according to relevance of such query. Still further, the system 100 can be utilized with a device such as a mobile communication device, an electronic device, a portable device, a portable digital assistant (PDA), a laptop, a computer, a machine, a cellular device, a smartphone, a portable gaming device, a gaming console, a desktop computer, a hand-held, a browsing device, a media player, a portable media device, etc.

The data store 106 can include any suitable data related to the display engine 102, the real time monitor component 104, the users 108, etc. It is to be appreciated that the data store 106 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 106 of the subject systems and methods is intended to comprise, without being limited to, these and any other suitable types of memory. In addition, it is to be appreciated that the data store 106 can be a server, a database, a relational database, a hard drive, a pen drive, an external hard drive, a portable hard drive, and the like.

In addition, the system 100 can include any suitable and/or necessary interface component (not shown), which provides various adapters, connectors, channels, communication paths, etc. to integrate the display engine 102 and/or the real time monitor component 104 into virtually any operating and/or database system(s) and/or with one another. In addition, the interface component can provide various adapters, connectors, channels, communication paths, etc., that provide for interaction with the display engine 102, real time monitor component 104, the data store 106, and any other device and/or component associated with the system 100.

Figure 2:
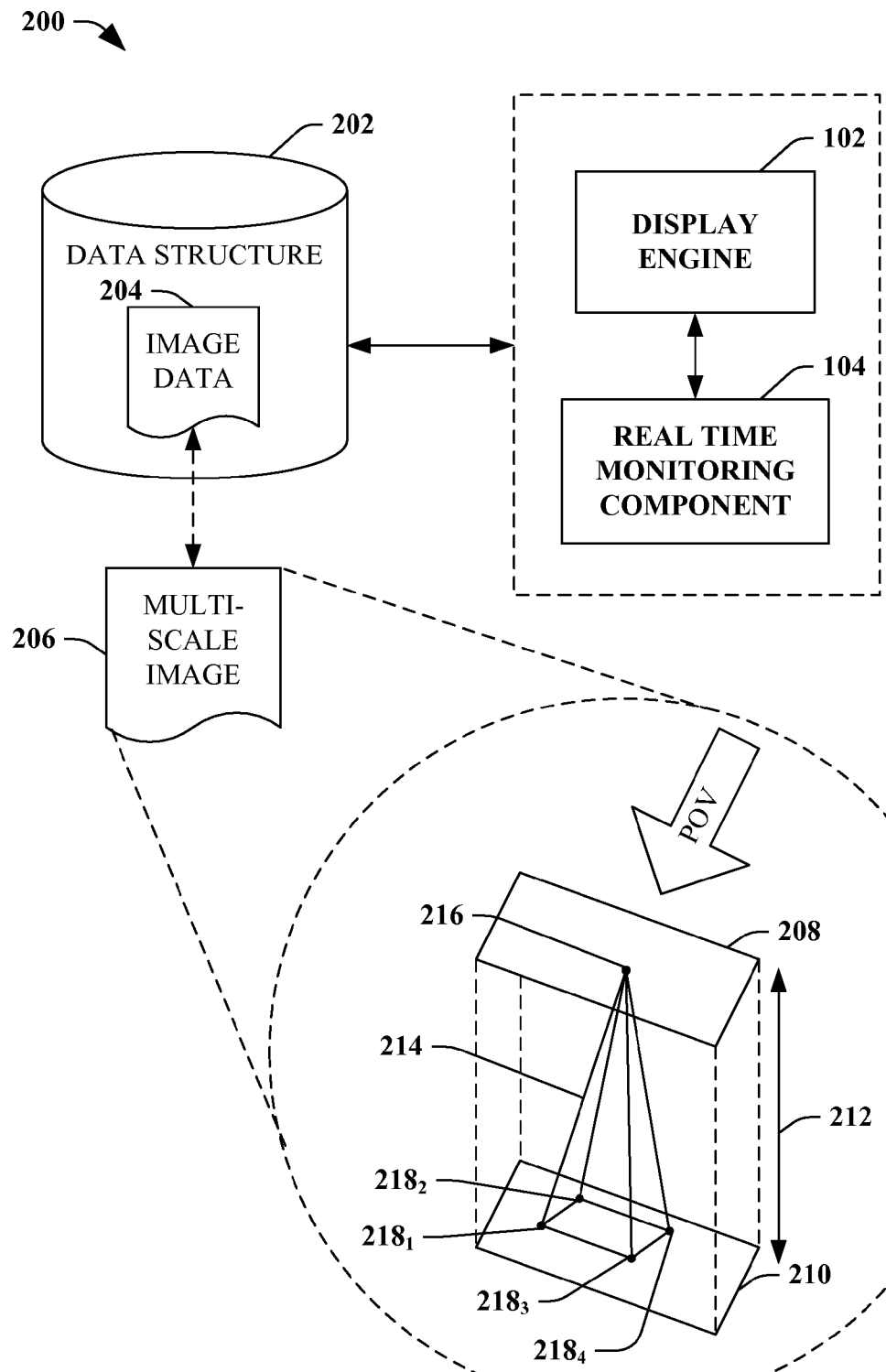
FIG. 2 illustrates a block diagram of an exemplary system that facilitates displaying two or more view levels associated with a portion of image data and/or data store data, the display includes scaling according to data properties.

FIG. 2 illustrates a system 200 that facilitates displaying two or more view levels associated with a portion of image data and/or data store data, the display includes scaling according to data properties. The system 200 can include the display engine 102 that can generate multi-scale views of data stored within a data store (not shown). The display engine 102 can provide multi-scale views of data stored within a data store in which such multi-scale views have scaled or re-sized graphical representations of data store data. The scaled or re-sized graphical representations of data store data can correspond with interaction or activity tracked by the real time monitor component 104. In other words, based on the interaction or activity tracked, data can be scaled or re-sized to reflect or convey such interaction or activity. Furthermore, the display engine 102 can utilize user-defined criteria (e.g., interaction or activity monitored, data properties, etc.) in order to provide multi-scaled views of data store data.

It is to be appreciated that the display engine 102 can utilize various criteria to sort or scale data within the data store 106. For example, the multi-scaled view or scaled view can be based upon at least one of activity with data within the data store, interaction with the data store, browsing within the data store, navigation within the data store, user interaction, location within the data store, data properties (e.g., size, location, time, owner, security, etc.). For instance, scale criteria can define scaling characteristics for the data store data on a particular view-level (e.g., a large amount of access relates to a large scale, a small amount of modification relates to a small size, a heavy amount of traffic relates to a large size, etc.). In another example, view-level criteria can define filters for data on the various view-levels (e.g., sort the view-levels according to user, a particular location of a data store relates to a particular level, an amount of data is represented on each view-level, a first view-level is modification properties and a second view-level is access properties, etc.). The criteria (e.g., scale criteria, view-level criteria, etc.) can be, but is not limited to being, data properties (e.g., creation data, accessed data, modification data, owner, location, size, type, application affiliation, security information, attributes, etc.), information associated with the data store (e.g., type of data store, location within data store, index information, tagging of data, table information, etc.), activity related to the data store, access, modification, traffic, user interaction, data use, creation of data, deletion of data, executing applications, and/or any other suitable attributes of data that can be depicted with multi-scaled views.

Generally, system 200 can include a data structure 202 with image data 204 that can represent, define, and/or characterize computer displayable multi-scale image 206, wherein the display engine 102 can access and/or interact with at least one of the data structure 202 or the image data 204 (e.g., the image data 204 can be any suitable portion of data within the data store 106 that is viewable, displayable, and/or browse able). In particular, image data 204 can include two or more substantially parallel planes of view (e.g., layers, scales, view-levels, etc.) that can be alternatively displayable, as encoded in image data 204 of data structure 202. For example, image 206 can include first plane 208 and second plane 210, as well as virtually any number of additional planes of view, any of which can be displayable and/or viewed based upon a level of zoom 212. For instance, planes 208, 210 can each include content, such as on the upper surfaces that can be viewable in an orthographic fashion. At a higher level of zoom 212, first plane 208 can be viewable, while at a lower level zoom 212 at least a portion of second plane 210 can replace on an output device what was previously viewable.

Moreover, planes 208, 210, et al., can be related by pyramidal volume 214 such that, e.g., any given pixel in first plane 208 can be related to four particular pixels in second plane 210. It should be appreciated that the indicated drawing is merely exemplary, as first plane 208 need not necessarily be the top-most plane (e.g., that which is viewable at the highest level of zoom 212), and, likewise, second plane 210 need not necessarily be the bottom-most plane (e.g., that which is viewable at the lowest level of zoom 212). Moreover, it is further not strictly necessary that first plane 208 and second plane 210 be direct neighbors, as other planes of view (e.g., at interim levels of zoom 212) can exist in between, yet even in such cases the relationship defined by pyramidal volume 214 can still exist. For example, each pixel in one plane of view can be related to four pixels in the subsequent next lower plane of view, and to 216 pixels (a vertex of pyramidal volume 214) in the next subsequent plane of view, and so on. Accordingly, the number of pixels included in pyramidal volume at a given level of zoom, l, can be described as $p=4^l$, where l is an integer index of the planes of view and where l is greater than or equal to zero. It should be appreciated that p can be, in some cases, greater than a number of pixels allocated to image 206 (or a layer thereof) by a display device (not shown) such as when the display device allocates a relatively small number of pixels to image 206 with other content subsuming the remainder or when the limits of physical pixels available for the display device or a viewable area is reached. In these or other cases, p can be truncated or pixels described by p can become viewable by way of panning image 206 at a current level of zoom 212.

However, in order to provide a concrete illustration, first plane 208 can be thought of as a top-most plane of view (e.g., l=0) and second plane 210 can be thought of as the next sequential level of zoom 212 (e.g., l=1), while appreciating that other planes of view can exist below second plane 210, all of which can be related by pyramidal volume 214. Thus, a given pixel in first plane 208, say, pixel 216, can by way of a pyramidal projection be related to pixels $218_1$-$218_4$ in second plane 210. The relationship between pixels included in pyramidal volume 214 can be such that content associated with pixels $218_1$-$218_4$ can be dependent upon content associated with pixel 216 and/or vice versa. It should be appreciated that each pixel in first plane 208 can be associated with four unique pixels in second plane 210 such that an independent and unique pyramidal volume can exist for each pixel in first plane 208. All or portions of planes 208, 210 can be displayed by, e.g. a physical display device with a static number of physical pixels, e.g., the number of pixels a physical display device provides for the region of the display that displays image 206 and/or planes 208, 210. Thus, physical pixels allocated to one or more planes of view may not change with changing levels of zoom 212; however, in a logical or structural sense (e.g., data included in image data 204) each success lower level of zoom 212 can include a plane of view with four times as many pixels as the previous plane of view.

Accordingly, a data store as described can include multiple view-levels associated with the graphical representation of data stored thereon. Moreover, the display engine 102 can leverage a conventional data store and provide multiple view-levels with multi-scaled views. In other words, the subject innovation can utilize a data store with multiple view-level data and/or apply multiple-view levels to data within the data store. It can be appreciated that the display engine 102 and/or the real time monitor component 104 can evaluate data within the data store (e.g., data structure 202, image data 204, multi-scale image 206, etc.) in order to scale or adjust the size of a graphic (corresponding to a portion of data within the data store) based on a relevancy to the selected criteria (e.g., scale criteria, view-level criteria, activity within the data store, data properties, etc.).

Figure 3:
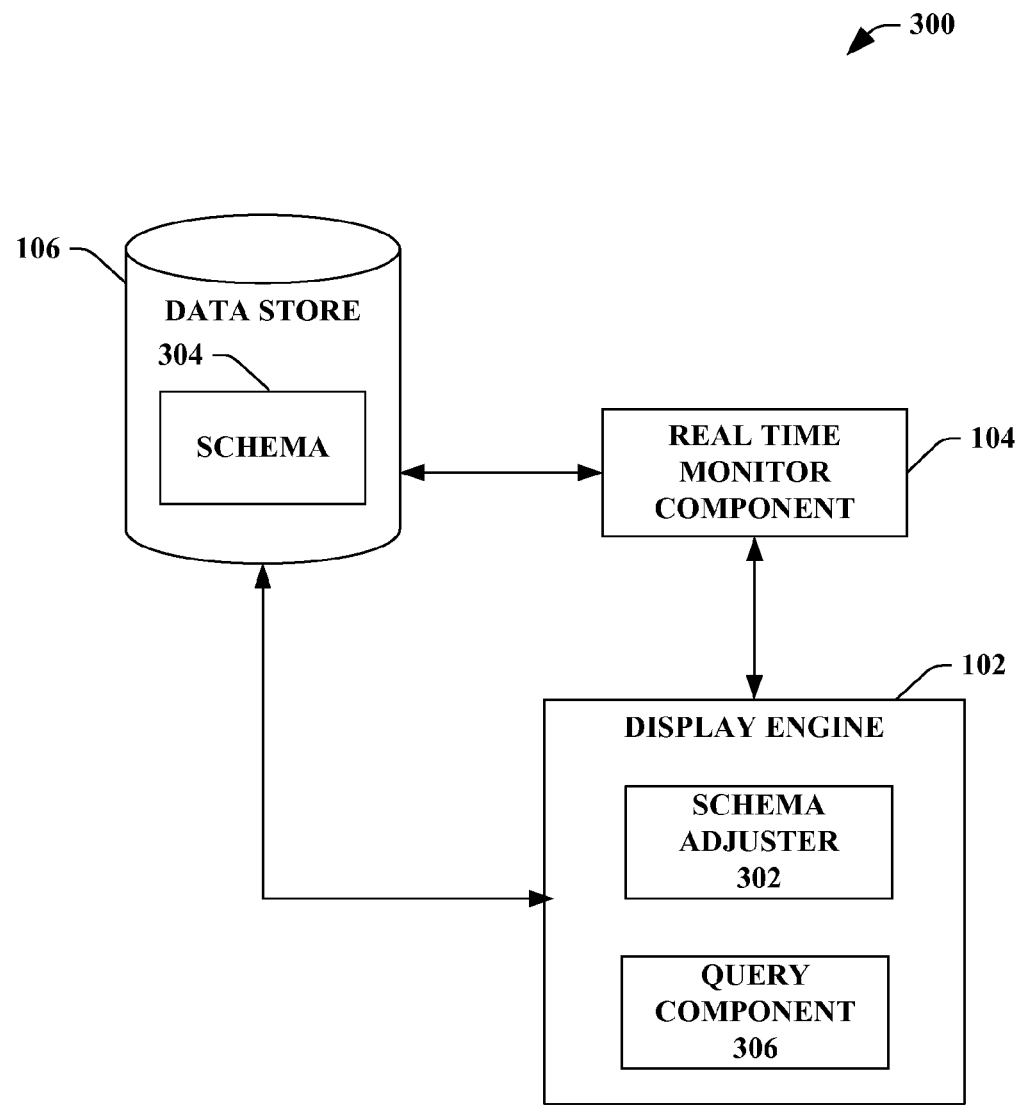
FIG. 3 illustrates a block diagram of an exemplary system that facilitates modifying schema and providing query results in accordance with the subject innovation.

FIG. 3 illustrates a system 300 that facilitates modifying schema and providing query results in accordance with the subject innovation. The system 300 can include the display engine 102 that enables multi-scaled views with one or more view-levels for data stored within the data store 106. In other words, graphical representations of data (e.g., icons, portions of images, graphics, avatars, etc.) can be scaled or sized based upon various criteria defined automatically, by a user, and/or any suitable combination thereof. For instance, a portion of a database can be graphically represented as a physical layout of the hardware structure, wherein portions of the graphically represented database can include multi-scaled views with one or more view-levels associated therewith allowing virtual navigation with the display engine 102. Furthermore, the display engine 102 can automatically scale or adjust data within the data store 106 based upon browsing or data interaction. The display engine 102 can leverage the real time monitor component 104 that tracks data activity in order to scale data accordingly. In other words, the system 300 can automatically and dynamically scale data within the data store 106 (e.g., larger scale or size to reflect more relevance) based upon user interaction or activity related to such data.

The real time monitor component 104 can evaluate any suitable activity associated with the data store 106. For example, the real time monitor component 104 can evaluate data access, data use, creation of data, deletion of data, data properties, and/or executing applications (e.g., word processing applications, communication applications, email applications, instant messenger applications, software, operating system data, etc.) associated with the data store 106. In another example, the real time monitor component 104 can analyze behavior within the data store 106 such as, but not limited to, click frequency, scroll frequency, highlighting, inputs, input device location (e.g., mouse cursor, etc.), etc. In still another example, the real time monitor component 104 can examine data from usage of the data store 106. For instance, the system 300 can evaluate information such as, but not limited to, duration of browsing on a particular portion of data, data tagging, frequency of visit/browsing, implicit user data (e.g., passive monitoring of browsing activity, etc.), explicit user data (e.g., search strings, contextual data, etc.), profile data, user settings, user preferences, etc., wherein such evaluated information can be utilized to scale graphical representations of data within the data store 106.

The display engine 102 can include a schema adjuster 302 that enables adjustment or modification of a portion of schema 304 associated with the data store 106. In particular, the schema adjuster 302 can modify the portion of schema 304 based at least in part upon the display engine 102 interaction with the data store 304. For example, access with the data store 106 can be monitored and tracked (e.g., by the real time monitor component 104) in which the schema adjuster 302 can modify the schema 304 based upon such access. For instance, the schema can be modified in that a portion of data stored within a first table can have a low amount of access and can be relocated to a second table, wherein the second table can then host groups of data having a low amount of data access. By managing the schema 304 and, in turn, the data store 106 based on activity and/or interaction tracked by the real time monitor component 104, the efficiency of the data store 106 can be greatly enhanced. It is to be appreciated that the data store 106 and/or the schema 304 can be modified based upon any suitable criteria such as, but not limited to, data access, data modification, data creation, data deletion, data properties (e.g., size, location, owner, security, etc.). Moreover, it is to be appreciated that any suitable characteristic of the schema 304 can be modified by the schema adjuster 302 such as, but not limited to, tables, index, keys, columns, rows, data locations, tags, etc.

In another example, the schema adjuster 302 can diminish or eliminate portions of data within the data store 106 that are rarely or never used or accessed to ensure the view is informative (e.g., manipulation of a schema related to the data store). In still another example, a database, for example, can be searched over gender, size, color, but rarely property X. The display engine can allow the database to be viewed in which property X is illustrated relative to its popularity (e.g., very small in size with this case). Moreover, the schema related to the database can be modified in order to increase efficiency in light of property X being rarely accessed or searched.

The display engine 102 can further include a query component 306 that facilitates querying data. In one instance, the query component 306 can receive a query and provide query results based at least in part upon the received query. The display engine 102 can further generate a multi-scaled view with at least one query result. In another instance, the query component 306 can provide query results in response to a query and/or defined criteria (e.g., scale criteria, view-level criteria, etc.). In other words, the query component 306 can receive a query and collect query results associated with such query and present any relevant query result with multi-scale views and/or one or more substantially parallel planes of view. Thus, a user can dictate data presentation at a preferred granular scale or in accordance with user-selected criteria (e.g., scale criteria, view-level criteria, etc.). For instance, a book can be scaled (e.g., table of contents, chapters, pages, etc.), code can be scaled to (e.g., functionality, interfaces, inputs, outputs, variable names, etc.), or movies can be scaled (e.g., actors, dialogs, scenes, locations, etc.). Generally, any suitable data on a data store can be scaled or organized in a multi-scale view with one or more view-levels based on criteria.

For example, a database can include code that can be queried by a user based upon selected criteria. The code can be queried and such results can be scaled or re-sized based upon the criteria. Following the example, the criteria can be amount of traffic, amount of execution, function execution amount, amount of variable change, memory usage, etc. and the results can be scaled in accordance with relevancy to such criteria (e.g., increase in size corresponds to increase in amount or usage, etc.). It is to be appreciated that the data store 106 can be queried for any suitable data request utilizing any suitable criteria, wherein the query results can be presented with multi-scaled views and/or view-levels.

Figure 4:
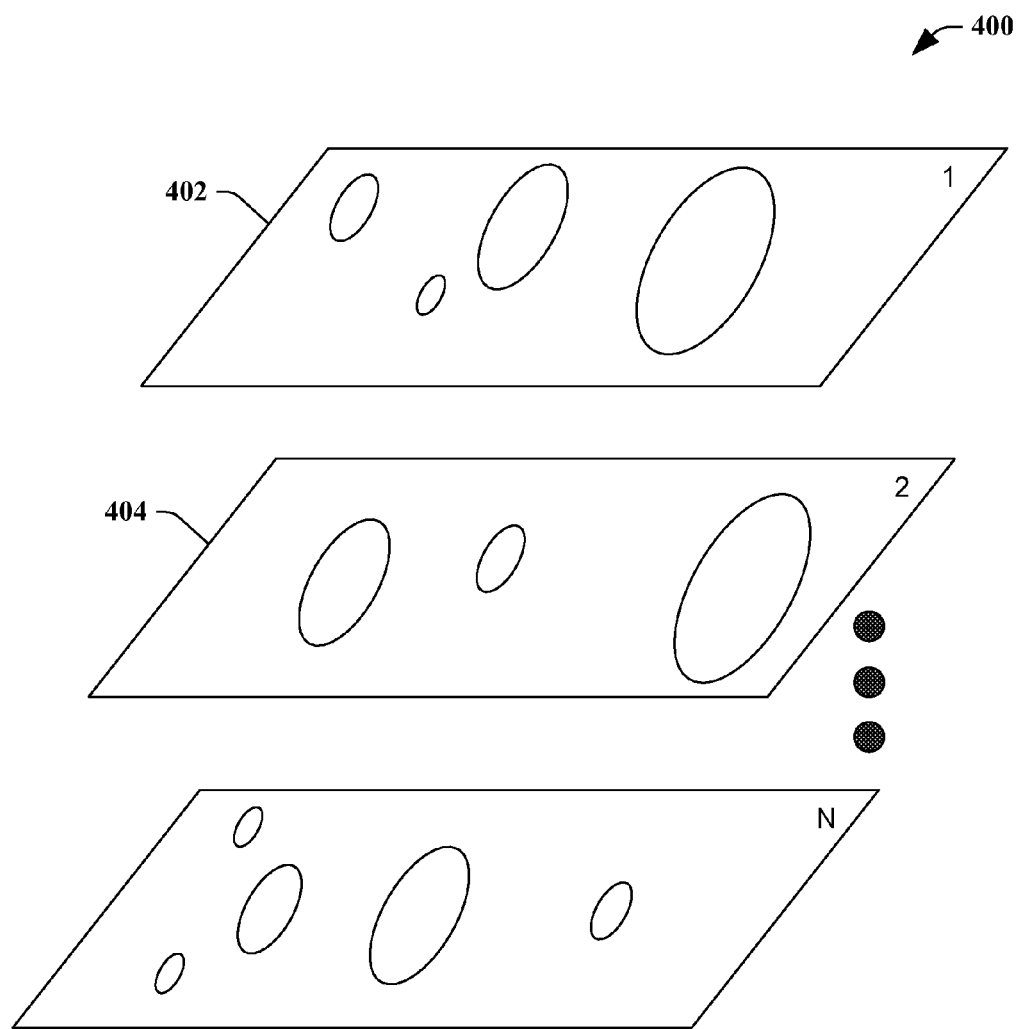
FIG. 4 illustrates a block diagram of an exemplary system that facilitates presenting data store information with view-levels and scaled data.

FIG. 4 illustrates a system 400 that facilitates presenting data store information with view-levels and scaled data. The system 400 depicts various view-levels of data, wherein each view-level can include multi-scaled data. In particular, the multi-scaled data can be graphics representative of data within a data store in which the graphic can be scaled and/or re-sized according to criteria (e.g., data access, data modification, data properties, information associated with the data store, activity related to the data store, scale criteria, view-level criteria, data use, creation of data, deletion of data, executing applications, etc.). Specifically, the system 400 can include any suitable number of view-levels in order to present multi-scaled views of data within a database such as view-level $_1$, view-level $_2$, to a view level $_N$, where N is a positive integer.

The system 400 illustrates a first view-level 402 and a second view-level 404. It is to be appreciated that there can be any suitable number of view-levels, wherein data displayed or conveyed in each view-level can be defined by a view-level criteria. Moreover, it is to be appreciated that on each view-level, scale criteria can define the manner in which data is scaled (e.g., scaling characteristics, amount of scaling, scaled according to a particular criteria, etc.). In this particular example, graphical representations of data are illustrated as ovals, wherein the size of an oval correlates to a selected criteria (e.g., access, modification, activity, data property, etc.). For example, each view-level can be defined for a particular user (e.g., view-level criteria set on a per user definition scope) and on each view-level, the graphical representations can be scaled based upon the amount of data executed (e.g., scale criteria defining scaling characteristics). Thus, the first view-level 402 can correspond to a first user with graphics scaled based on the first user's data execution amounts. In another example, the view-levels can each depict selected criteria such as the following: a first view-level can be the amount of data access; the second view-level can be size of data; and the third view-level can be age; and so on and so forth.

Figure 5:
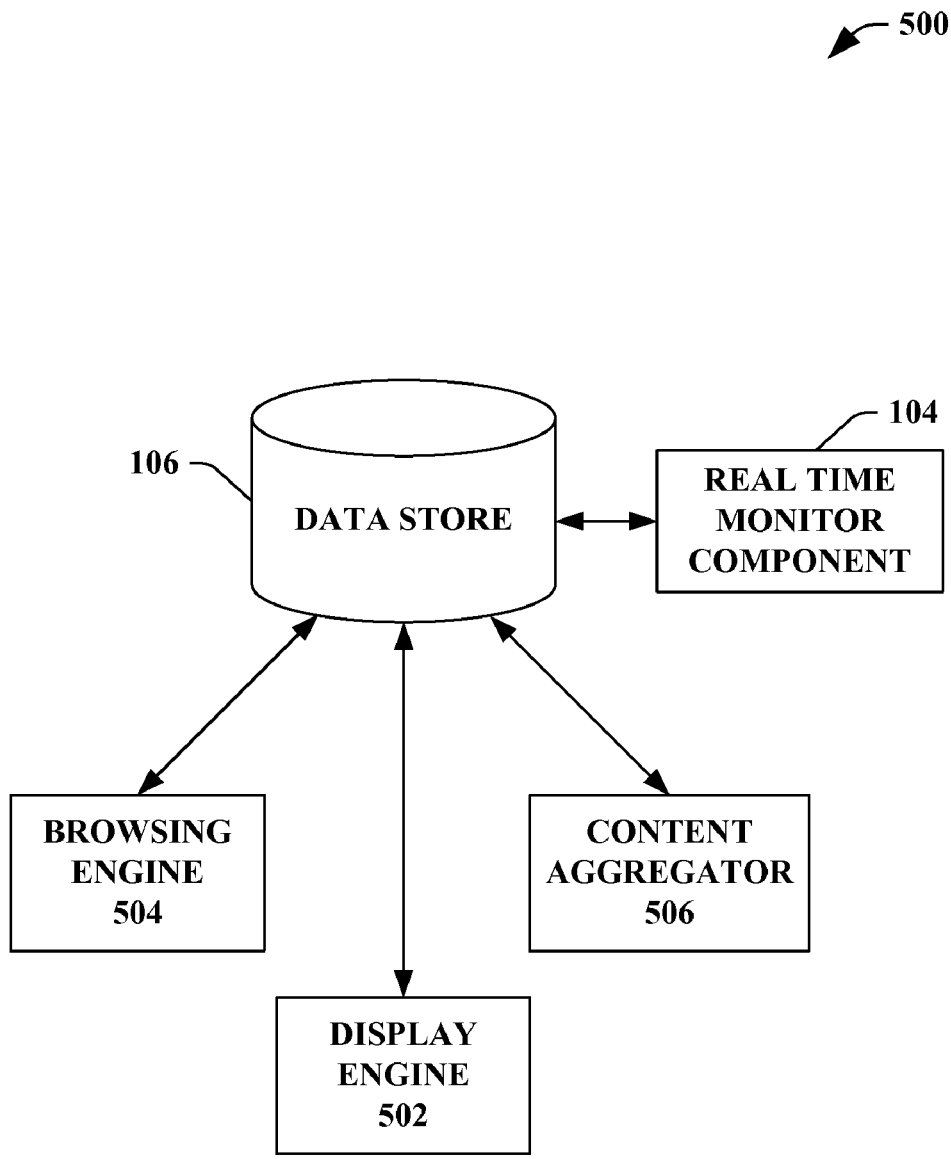
FIG. 5 illustrates a block diagram of exemplary system that facilitates enhancing implementation of rendering scaled views of data store information with a display technique, a browse technique, and/or a virtual environment technique.

FIG. 5 illustrates a system 500 that facilitates enhancing implementation of rendering scaled views of data store information with a display technique, a browse technique, and/or a virtual environment technique. The system 500 can include the real time monitor component 104 and the data store 106 as described above. The system 500 can further include a display engine 502 that enables seamless pan and/or zoom interaction with any suitable displayed data or network data, wherein such data can include multiple scales or views and one or more resolutions associated therewith. In other words, the display engine 502 can manipulate an initial default view for displayed data by enabling zooming (e.g., zoom in, zoom out, etc.) and/or panning (e.g., pan up, pan down, pan right, pan left, etc.) in which such zoomed or panned views can include various resolution qualities. The display engine 502 enables visual information to be smoothly browsed regardless of the amount of data involved or bandwidth of a network. Moreover, the display engine 502 can be employed with any suitable display or screen (e.g., portable device, cellular device, monitor, plasma television, etc.). The display engine 502 can further provide at least one of the following benefits or enhancements: 1) speed of navigation can be independent of size or number of objects (e.g., data); 2) performance can depend on a ratio of bandwidth to pixels on a screen or display; 3) transitions between views can be smooth; and 4) scaling is near perfect and rapid for screens of any resolution.

It is to be appreciated and understood that the display engine 502 can be substantially similar to the display engine 102 described above.

For example, an image can be viewed at a default view with a specific resolution. Yet, the display engine 502 can allow the image to be zoomed and/or panned at multiple views or scales (in comparison to the default view) with various resolutions. Thus, a user can zoom in on a portion of the image to get a magnified view at an equal or higher resolution. By enabling the image to be zoomed and/or panned, the image can include virtually limitless space or volume that can be viewed or explored at various scales, levels, or views with each including one or more resolutions. In other words, an image can be viewed at a more granular level while maintaining resolution with smooth transitions independent of pan, zoom, etc. Moreover, a first view may not expose portions of information or data on the image until zoomed or panned upon with the display engine 502.

A browsing engine 504 can also be included with the system 500. The browsing engine 504 can leverage the display engine 502 to implement seamless and smooth panning and/or zooming for any suitable data browsed in connection with at least one of the Internet, a network, a server, a website, a web page, and the like. It is to be appreciated that the browsing engine 504 can be a stand-alone component, incorporated into a browser, utilized with in combination with a browser (e.g., legacy browser via patch or firmware update, software, hardware, etc.), and/or any suitable combination thereof. For example, the browsing engine 504 can be incorporate Internet browsing capabilities such as seamless panning and/or zooming to an existing browser. For example, the browsing engine 504 can leverage the display engine 502 in order to provide enhanced browsing with seamless zoom and/or pan on a website, wherein various scales or views can be exposed by smooth zooming and/or panning.

The system 500 can further include a content aggregator 506 that can collect a plurality of two dimensional (2D) content (e.g., media data, images, video, photographs, metadata, trade cards, etc.) to create a three dimensional (3D) virtual environment that can be explored (e.g., displaying each image and perspective point). In order to provide a complete 3D environment to a user within the virtual environment, authentic views (e.g., pure views from images) are combined with synthetic views (e.g., interpolations between content such as a blend projected onto the 3D model). For instance, the content aggregator 506 can aggregate a large collection of photos of a place or an object, analyze such photos for similarities, and display such photos in a reconstructed 3D space, depicting how each photo relates to the next. It is to be appreciated that the collected content can be from various locations (e.g., the Internet, local data, remote data, server, network, wirelessly collected data, etc.). For instance, large collections of content (e.g., gigabytes, etc.) can be accessed quickly (e.g., seconds, etc.) in order to view a scene from virtually any angle or perspective. In another example, the content aggregator 506 can identify substantially similar content and zoom in to enlarge and focus on a small detail. The content aggregator 506 can provide at least one of the following: 1) walk or fly through a scene to see content from various angles; 2) seamlessly zoom in or out of content independent of resolution (e.g., megapixels, gigapixels, etc.); 3) locate where content was captured in relation to other content; 4) locate similar content to currently viewed content; and 5) communicate a collection or a particular view of content to an entity (e.g., user, machine, device, component, etc.).

It is to be appreciated that any suitable data store 106 data interacted with utilizing at least one of the display engine 502, the browsing engine 504, and/or the content aggregator 506 can be scaled or re-sized by the system 500. For example, the display engine 502 can navigate data store data and included view levels as well as scaled views of data store data (e.g., scaled based upon criteria, etc.). In another example, the browsing engine 504 can be leveraged in which explored data store data can be rendered with scales or sizes reflective of relevancy to criteria. In still another example, data store data exploration (e.g., viewed data, perspective of such viewed data, etc.) within a 3D environment created from 2D content can be scaled or presented.

Figure 6:
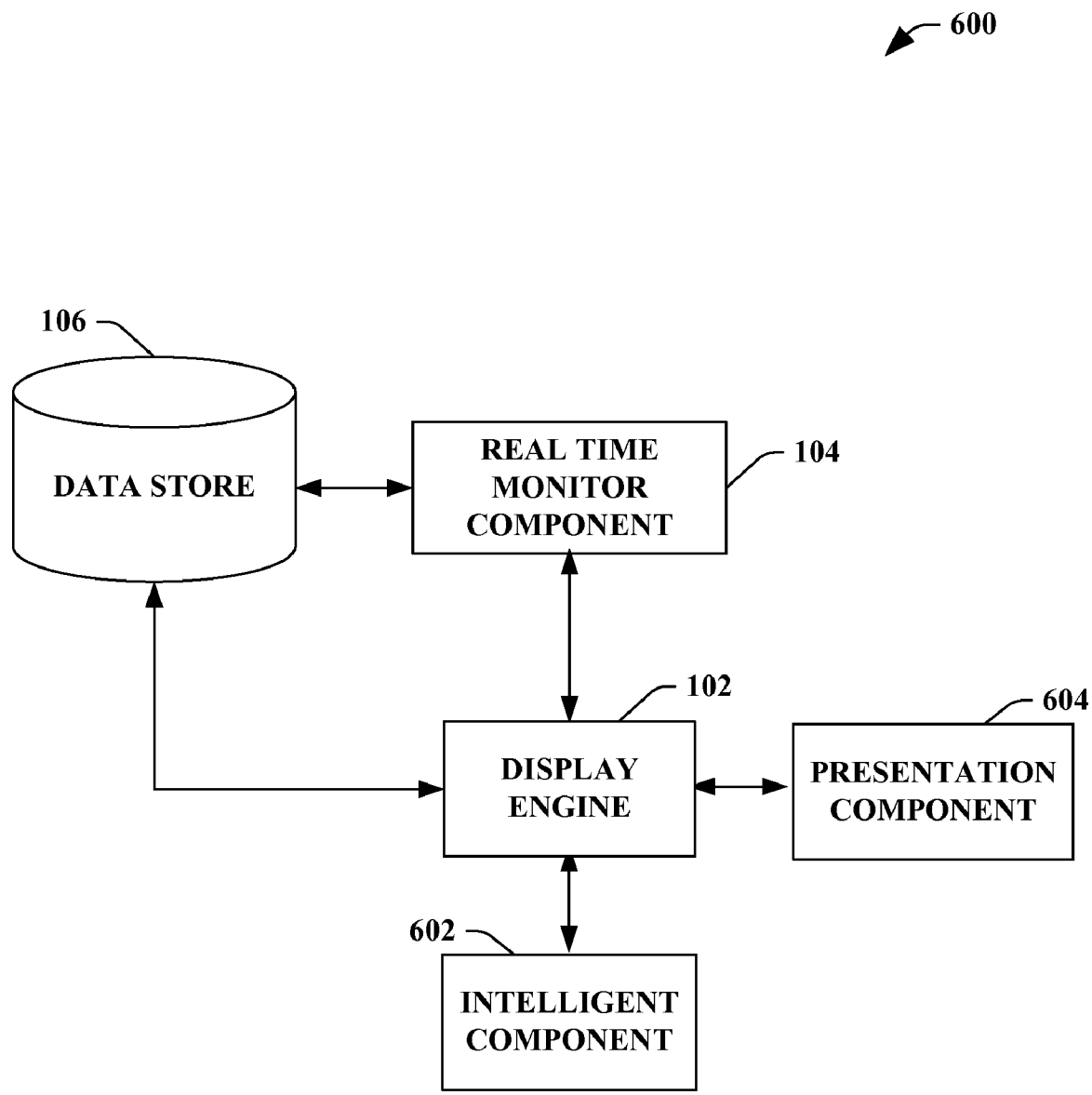
FIG. 6 illustrates a block diagram of an exemplary system that facilitates automatically rendering views to convey data store information based on data store interaction.

FIG. 6 illustrates a system 600 that employs intelligence to facilitate automatically rendering views to convey data store information based on data store interaction. The system 600 can include the display engine 102, the real time monitor component 104, the data store 106 which can be substantially similar to respective engines, components, and data stores described in previous figures. The system 600 further includes an intelligent component 602. The intelligent component 602 can be utilized by the display engine 102 to facilitate scaling data in accordance with criteria in order to efficiently display relationships and/or data associated with the data store 106. For example, the intelligent component 602 can infer scaling for a portion of data within the data store 106, criteria (e.g., scale criteria, view-level criteria, etc.), user preferences regards to criteria (e.g., preferred criteria, settings, configurations, etc.), amount of access, amount of modifications, amount of creation, amount of deletion, data properties, query results, query terms, search terms, keywords, revised query recommendations, schema optimized settings (e.g., index, tables, tags, columns, definitions, etc.), user activity with the data store 106, graphical representation for data preferences, real time monitoring preferences (e.g., tracking duration, database location to track, etc.), user names, passwords, display engine settings, etc.

The intelligent component 602 can employ value of information (VOI) computation in order to identify scaling data store data according to criteria. For instance, by utilizing VOI computation, the most ideal and/or appropriate scaling for data can be determined. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The display engine 102 can further utilize a presentation component 604 that provides various types of user interfaces to facilitate interaction between a user and any component coupled to the display engine 102. As depicted, the presentation component 604 is a separate entity that can be utilized with the display engine 102. However, it is to be appreciated that the presentation component 604 and/or similar view components can be incorporated into the display engine 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the display engine 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
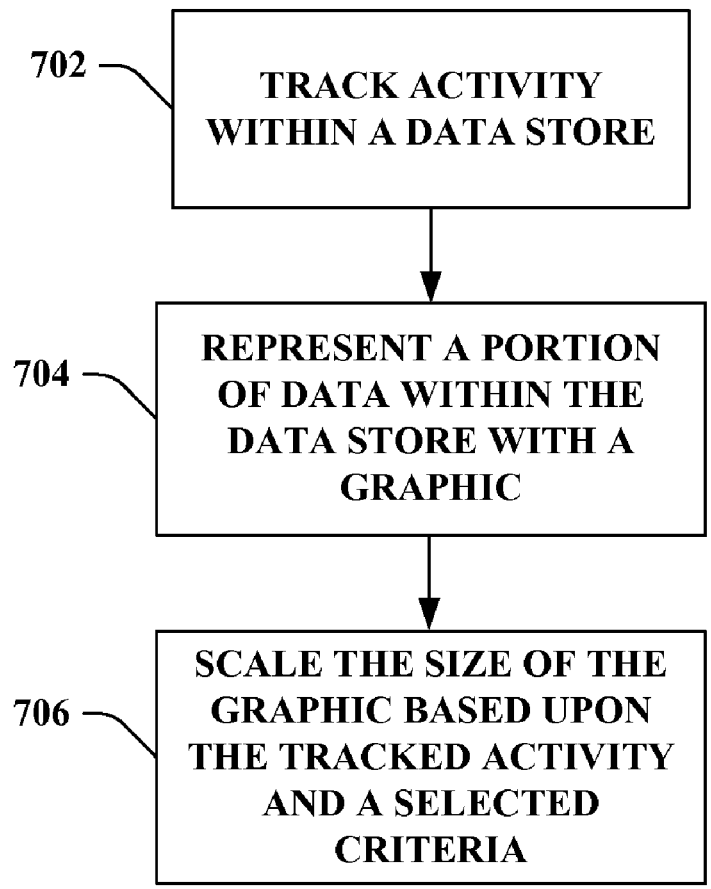
FIG. 7 illustrates an exemplary methodology for rendering multi-scale views of data associated with a data store.
Figure 8:
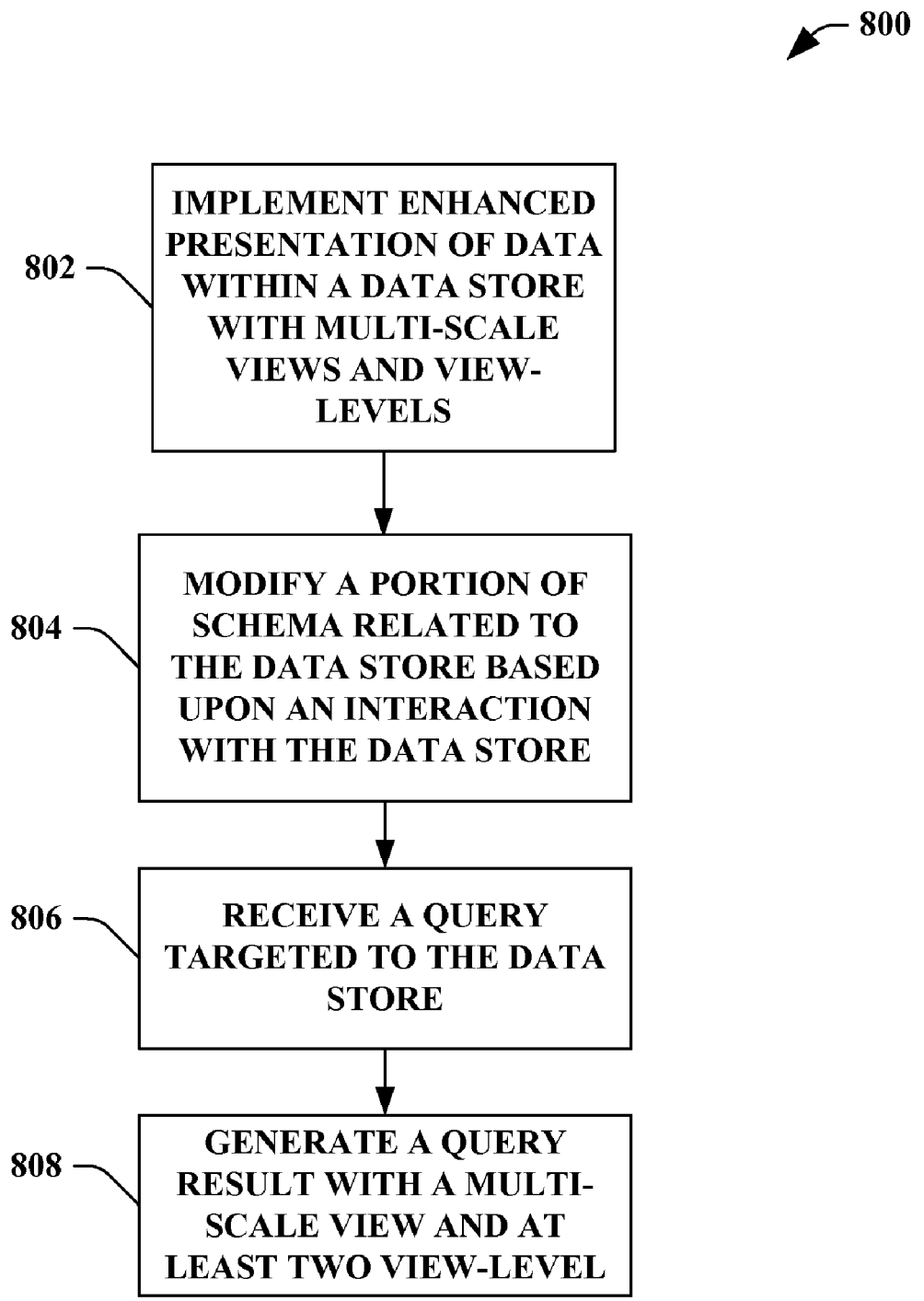
FIG. 8 illustrates an exemplary methodology that facilitates providing query results associated with a data store and manipulating a schema based on interaction therewith.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates rendering multi-scale views of data associated with a data store. At reference numeral 702, activity within a data store can be tracked. Activity with the data store or a portion of data within the data store can be monitored in real time. In particular, activity such as data browsing, access, modification, viewing, deletion, creation, data property viewing, etc. can be monitored. Moreover, the data store can be interacted with utilizing a data engine that enables seamless pans and zooms with multi-scale data within the data store, wherein the data store can include one or more view-levels.

At reference numeral 704, a portion of data within the data store can be represented with a graphic. For instance, a portion of data within the data store can be represented by, but not limited to, an icon, a portion of a graphic, a portion of text, a portion of audio, a portion of video, etc. In general, the portion of graphic can be displayed to represent the data within the data store. At reference numeral 706, the size of the graphic can be scaled based upon the tracked activity and selected criteria. Based on the tracked activity, the graphic can be scaled or re-sized in which a large size can reflect a large correlation with the criteria or activity and a small size can reflect a small correlation with the criteria or activity. For instance, if the activity is data access, a portion of data and its graphic can be scaled large if the portion of data is frequently accessed. Moreover, selected criteria can define scaling the graphics. For example, the selected criteria can be, but is not limited to being, data access, data modification, data properties (e.g., size, owner, security, attributes, type, etc.), information associated with the data store, activity related to the data store, scale criteria, view-level criteria, data use, creation of data, deletion of data, executing applications, etc.

FIG. 8 illustrates a method 800 for providing query results associated with a data store and manipulating a schema based on interaction therewith. At reference numeral 802, an enhanced presentation of data within a data store can be implemented, wherein the data store can have a multi-scale view and at least one view-level. The multi-scale view can include scaled data and at least two or more substantially parallel planes of view (e.g., view-levels) that can be viewed with a zoom utilizing a display engine (discussed above). Generally, the data store can be displayed with multi-scale views and view-levels (e.g., substantially parallel planes of view) in order to efficiently convey large amounts of data to a user in an efficient manner.

At reference numeral 804, a portion of schema related to the data store can be modified based upon an interaction with the data store. In particular, the interaction with data browsed or accessed within the data store utilizing the display engine (e.g., scaled data viewed, view-levels accessed, etc.). Thus, based on such interaction with the data store, the schema related thereto can be modified. The portion of schema can be modified in order to increase efficiency and speed of data access/retrieval (e.g., read, write, etc.). For instance, tables, indexes, columns, rows, tags, etc. can be modified in order to optimize the data store. In one example, data from a plurality of tables that has been infrequently accessed can be aggregated and distributed to a table (e.g., rarely accessed data is in a single table).

At reference numeral 806, a query targeted to the data store can be received. For example, the query can be received from a user in which any suitable terms, key words, phrases, and such can be aimed to retrieve data from a data store. At reference numeral 808, a query result with a multi-scale view and at least two view-levels that are substantially parallel to one another. For example, a user can query to identify data deleted by user A and user B. Such results can be returned to the user in that graphics scaled large can be reflective of a large sized portion of data deleted and a first view-level can be assigned to render data deletion for user A and a second view-level can be assigned for user B. The query results can further be explored and navigated utilizing a display engine that allows seamless pans and zooms on multi-scaled data and the two or more substantially parallel view-levels.

Figure 9:
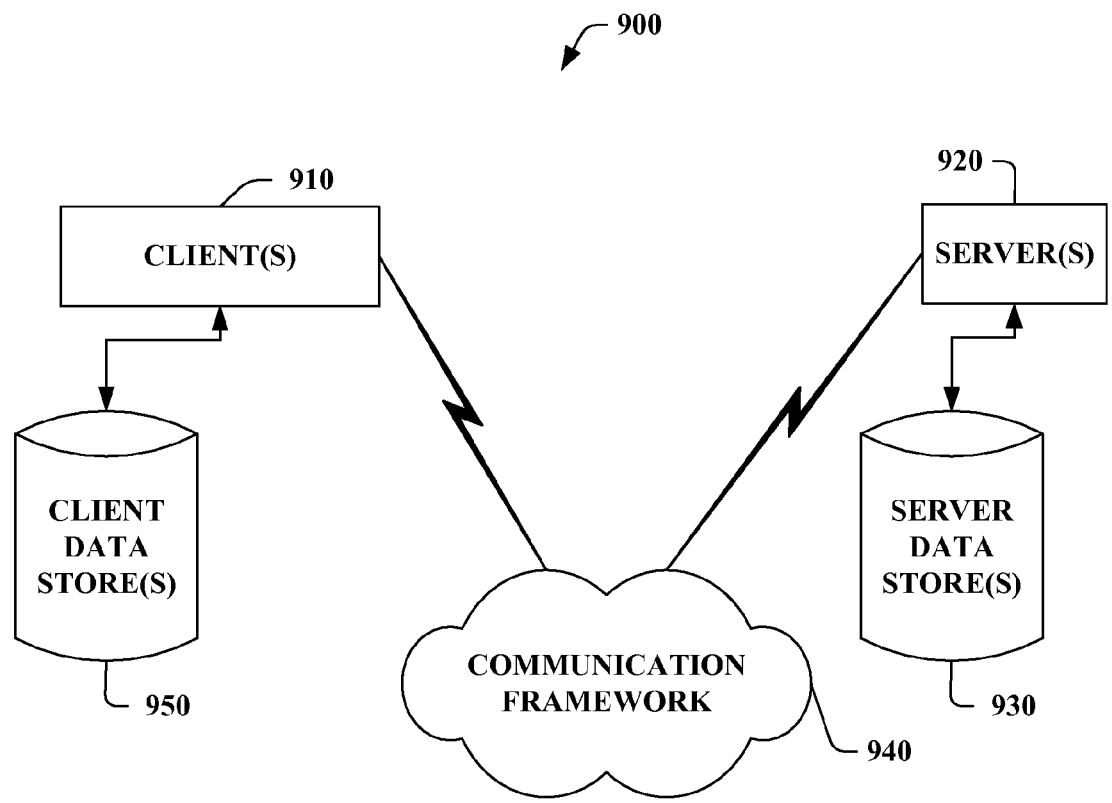
FIG. 9 illustrates an exemplary networking environment, wherein the novel aspects of the claimed subject matter can be employed.
Figure 10:
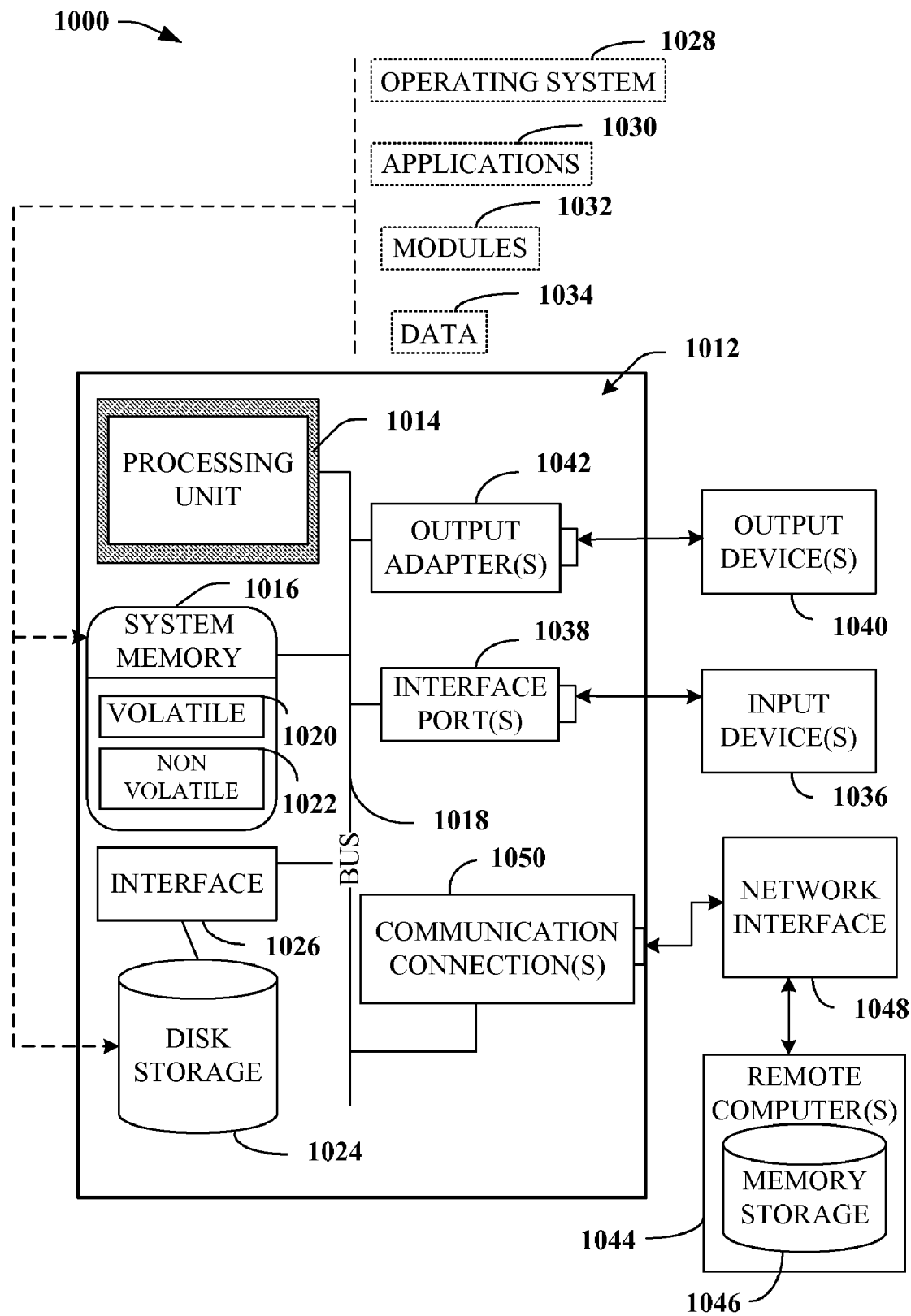
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a real time monitor component that tracks interaction with a data store to enhance views of data with a display engine, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system, comprising:
a data store that stores a portion of data accessible to a user;
a real time monitor component that dynamically tracks an amount of access for the portion of data within the data store;
a display engine that renders a multi-scaled view of the portion of data, the multi-scaled view being based on the amount of access associated with the portion of data and a size representation of the portion of data, the size representation of the portion of data being representative of the amount of access associated with the portion of data, a frequency at which the portion of data is modified, and an amount of deleted data associated with the portion of data; and
the display engine further including a query component that queries data within the data store and displays a query result in a size correlating to a relevancy of the query result to a query, the portion of data being rendered in the multi-scaled view when it is determined that the portion of data is included within the query result.

2. The system of claim 1, wherein the display engine renders the multi-scaled view of the portion of data to include at least two substantially parallel planes of view in which a first plane and a second plane are alternatively displayable based upon a level of zoom and which are related by a pyramidal volume.

3. The system of claim 2, wherein the second plane of view displays a portion of the first plane of view at one of a different scale or a different resolution based upon the amount of access.

4. The system of claim 2, wherein the second plane of view displays a portion of the image data that is graphically or visually unrelated to the first plane of view based upon the amount of access.

5. The system of claim 2, wherein the second plane of view displays a portion of the image data that is disparate than the portion of the image data associated with the first plan of view based the amount of access.

6. The system of claim 1, wherein the portion of data within the data store is represented by a portion of a graphic, a size of the portion of graphic is representative of the amount of access.

7. The system of claim 1, wherein the real time monitor component dynamically tracks activity related to the data store, the activity is at least one of data modification, data use, data creation, data deletion, a data property, an execution of an application within the data store, or a portion of information associated with the data store.

8. The system of claim 7, wherein the display engine scales the portion of data within the data store based upon an amount of the activity, the amount of the activity correlates to a size of the portion of data.

9. The system of claim 1, wherein the display engine scales the portion of data within the data store based on selected criteria, the selected criteria is at least one of a data property, a data attribute, the amount of access, an amount of modification, the amount of deleted data, an amount of created data, a size of data, a data type, an application affiliation, an owner, a portion of security data, a portion of information related to the data store, a type of data store, a location within data store, a portion of index information, a data tag, a portion of table information, an interaction with the data store, or a browsing within the data store.

10. The system of claim 9, wherein the selected criteria is at least one of a scale criteria that defines scaling on a particular view-level related to the multi-scale view or a view-level criteria that defines data included on each view-level related to the multi-scale view.

11. The system of claim 1, further comprising a schema adjuster that automatically modifies a portion of a schema related to the data store based at least in part upon the amount of access.

12. The system of claim 11, wherein the schema adjuster relocates the portion of data from a first table to a second table based upon the amount of access to the portion of data.

13. The system of claim 11, wherein the schema adjuster modifies the portion of schema related to the data store based at least in part upon a selected criteria.

14. The system of claim 11, wherein the schema adjuster modifies at least one of a table within the data store, an index within the data store, a column within the data store, a row within the data store, a tag within the data store, or a key related to the data store.

15. The system of claim 1, wherein the query component provides at least one query result with a multi-scaled view.

16. The system of claim 15, wherein the multi-scaled view includes at least two substantially parallel planes of view in which a first plane and a second plane are alternatively displayable based upon a level of zoom and which are related by a pyramidal volume, the first plane corresponds to a first scope of the query and the second plane corresponds to a second scope of the query.

17. A method, comprising:
tracking, by a computing device, activity within a data store;
representing, by the computing device, a first portion of data within the data store with a portion of a graphic;
scaling, by the computing device, a size of the portion of the graphic based upon an amount of tracked activity;
receiving, by the computing device, a query for the first portion of data within the data store;
displaying, by the computing device, a query result in a size corresponding to a relevancy of the query result to the query;
determining, by the computing device, that a first amount of access associated with the first portion of data is less than a second amount of access that is associated with a second portion of data; and
relocating, by the computing device and based at least in part on the determining, the first portion of data from a first table of the data store to a second table of the data store that stores a plurality of other data that has a third amount of access that is less than the second amount of access associated with the second portion of data.

18. The method of claim 17, further comprising:
implementing an enhanced presentation of data within the data store with a multi-scale view, the multi-scale view includes at least two substantially parallel planes of view in which a first plane and a second plane are alternatively displayable based upon a level of zoom and which are related by a pyramidal volume; and
modifying a portion of a schema related to the data store based upon the amount of tracked activity;
wherein the query result includes a multi-scale view, the multi-scale view includes at least two substantially parallel planes of view in which a first plane and a second plane are alternatively displayable based upon a level of zoom and which are related by a pyramidal volume.

19. The method of claim 17, further comprising scaling the size of the portion of the graphic based upon a selected criteria, the selected criteria being at least one of a data property, a data attribute, an amount of access, an amount of modification, an amount of deleted data, an amount of created data, a size of data, a data type, an application affiliation, an owner, a portion of security data, a portion of information related to the data store, a type of data store, a location within data store, a portion of index information, a data tag, a portion of table information, a scale criteria, a view-level criteria, an interaction with the data store, or a browsing within the data store.

20. A system, comprising:
computer-executable instructions that, when executed by a processor, perform operations comprising:
storing a first portion of data in a relational database;
browsing the first portion of data with at least one of a dynamic and seamless zoom or a dynamic and seamless pan;
monitoring data interaction within the relational database;
rendering a multi-scaled view of the first portion of data, the multi-scaled view is based on the browsing of the first portion of data;
correlating a size representation of to the first portion of data to the browsing;
modifying a portion of a schema related to the relational database based at least in part upon the monitoring, the modifying including:
relocating the first portion of data stored within a first table of the relational database to a second table of the relational database when a first amount of access associated with the first portion of data is determined to be less than a second amount of access that is associated with a second portion of data; and
diminishing or eliminating the first portion of data within the relational database when the first amount of access associated with the first portion of data is determined to be less than the second amount of access associated with the second portion of data;
receiving a query from a user targeted for the relational database; and
presenting a query result related to the query with a multi-scaled view having a size representation that corresponds to a relevance of the query result to the query, the multi-scaled view of the query result includes at least two substantially parallel planes of view in which a first plane and a second plane are alternatively displayable based upon a level of zoom and which are related by a pyramidal volume.

* * * * *

UNITED STATES PATENT AND TRADEMARK OFFICE
CERTIFICATE OF CORRECTION

PATENT NO.        : 8,352,524 B2                                      Page 1 of 1
APPLICATION NO.   : 12/112639
DATED             : January 8, 2013
INVENTOR(S)       : Flake et al.

It is certified that error appears in the above-identified patent and that said Letters Patent is hereby corrected as shown below:

In the Claim

Column 20, line 29, Claim 20, before "the" delete "to".

Signed and Sealed this
Tenth Day of February, 2015

Michelle K. Lee
*Deputy Director of the United States Patent and Trademark Office*